Dec. 15, 1953  R. W. J. COCKRAM  2,662,945
ELECTRIC SWITCH
Filed Sept. 16, 1950  2 Sheets-Sheet 1

Inventor
Reginald W. J. Cockram
By
H. C. ———
Attorney

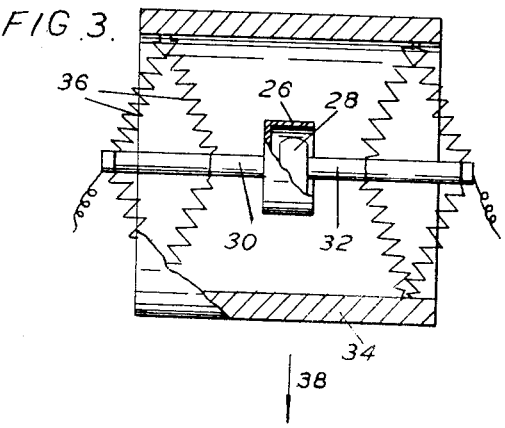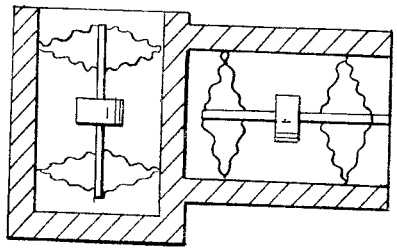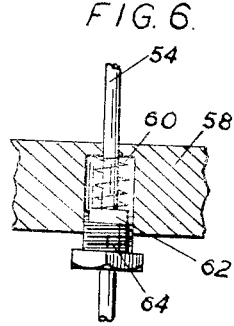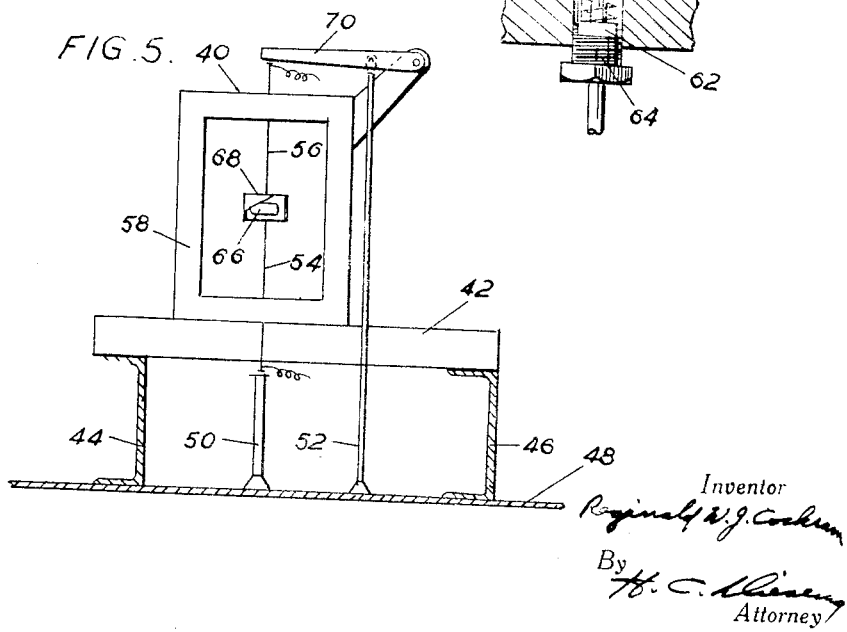

Patented Dec. 15, 1953

2,662,945

UNITED STATES PATENT OFFICE 2,662,945

ELECTRIC SWITCH

Reginald William James Cockram, London, England, assignor to The Pyrene Company, Limited, Brentford, England, a company of Great Britain Application September 16, 1950, Serial No. 185,215
Claims priority, application Great Britain
September 19, 1949

12 Claims. (Cl. 200—61.48)

Inertia switches are installed in aircraft to provide for the automatic electrical control of such apparatus as fire extinguishers in the event of a crash. These inertia switches include a body which can become displaced relatively to a housing and so close an electric circuit if the housing is subjected to sudden alterations of motion.

In practice it has been found difficult to ensure that an inertia switch will be insensitive to the quite violent movements of aircraft, especially fighter aircraft, in flight, and yet will with certainty close in the event of a crash. In particular it is difficult to ensure that the switch does not close when the aircraft is subjected to accelerations of several g in changing its direction of flight.

It is an object of the present invention to provide an inertia switch which will be insensitive or unresponsive to constant accelerations in a given direction but which will close when subject to sudden alterations of motion, as in response to differentials of velocity of higher order than acceleration, that are encountered under crash conditions.

Essentially inertia switches according to the present invention comprise two bodies that are separately resiliently supported in a housing and carry contact surfaces which are a short distance apart when the housing is stationary, remain apart when the housing is subject to a constant acceleration in the given direction, and come together when the housing is subject to a sudden alteration of motion.

Preferred embodiments of my invention are shown in the accompanying drawings in which:

Figure 3 is an elevation, with the housing broken away, of a second embodiment;

Figure 4 is a diagram of a multiple switch;

Figure 5 is a diagram of additional mechanism whereby a switch is made responsive to distortion of an aircraft skin; and Figure 6 is an enlarged detail of Figure 5.

Figure 1:
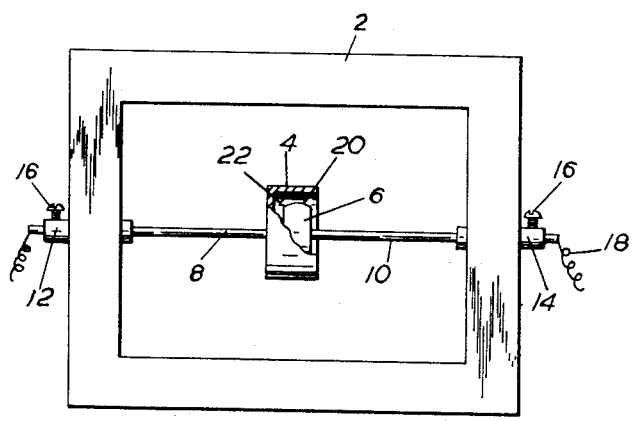
Figure 1 is an elevation of one embodiment at rest.
Figure 2:
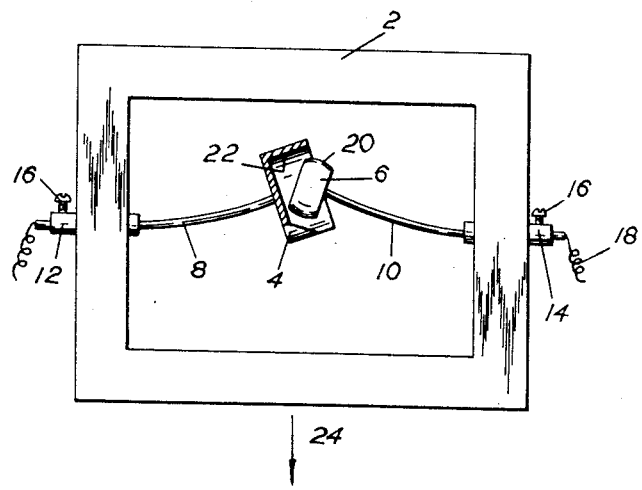
Figure 2 is an elevation of the same embodiment; subjected to a constant acceleration.

The switch shown in Figures 1 and 2 is intended for mounting in an aircraft and comprises a rectangular housing 2, which is secured to the aircraft frame, and two bodies 4 and 6. The body 4 is in the shape of a cup and the body 6 in the shape of a disc. When the housing 2 is at rest, as shown in Figure 1, the two bodies are supported, with the disc lying concentrically within the cup, by thin resilient rods 8 and 10. The cup 4 and disc 6 are of substantially equal mass but have differing moments of inertia about axes through their centres of gravity perpendicular to the rods. The two rods 8 and 10 pass through insulating bushes 12 and 14 in the housing 2 and are clamped by set screws 16. Electric leads 18 forming part of an indicating or alarm circuit are connected to the ends of the rods and under crash conditions the circuit is completed by contact between the outer surface 20 of the disc 6 and the inner surface 22 of the cup 4.

The resilience of the rods 8 and 10 is substantially the same and each rod can be adjusted slightly by sliding through the bushes 12 and 14 until under conditions of constant acceleration of the housing 2 in the direction of the arrow 24 in Figure 2 both the cup 4 and the disc 6 become displaced linearly relative to the housing 2 through substantially the same distance so that the contact surfaces 20 and 22 are maintained apart as shown in Figure 2. The linear displacements of the bodies under conditions of acceleration are accompanied by angular displacements. If the acceleration of the housing 2 changes from a constant value to a different constant value, the bodies 4 and 6 will move to different displaced positions, corresponding to the new acceleration. In flight conditions these movements will be slow and the clearance between the contact surfaces will not vary very greatly. Under crash conditions, however, there will be sudden movement of the bodies in the direction of the arrow 24, and by reason of their differing relevant moments of inertia, and therefore their differing natural frequencies of vibration on their supports, the displacements of the bodies 4 and 6 relative to the housing 2 will alter at different rates so that the contact surfaces 20 and 22 are brought together.

It will be apparent that there are a considerable number of variable quantities which must be correctly chosen in the design of this switch. Thus the mass and the relevant moment of inertia of both the cup and the disc are variable, and so also are the length and resilience of each of the rods 8 and 10 and the amount of the initial clearance between the cup and the disc. Quantitive data as to the motion of an aircraft in flight and under crash conditions are difficult to obtain and accordingly it may be convenient to adjust the switch by empirical experiments. This form of adjustment is assisted by making the cup and the disc of equal mass and the rods of substantially equal resilience. This, however, is not essential.

The switch shown in Figures 1 and 2 responds to the resolved component of motion of the housing 2 in a plane perpendicular to the line of the rods 8 and 10 when at rest. If it is desired to make the switch responsive to components of motion in one direction only, the rods 8 and 10 may be replaced by leaf springs.

Figure 3 illustrates a switch incorporating a different form of resilient support for the bodies. A cup 26 and discs 28 are each secured to the end of a rigid rod 30 and 32. These rods are themselves supported within a cylindrical housing 34 by a spider of tension springs 36. In this switch also the masses of the cup and disc are equal and the resilient supports are identical. Accordingly the response of the device to motion of the housing in the direction of the arrow 38 is similar to that of the switch shown in Figures 1 and 2. Motion of the housing 34 along the line of the rods 30 and 32 causes the two bodies to perform identical movements relative to the housing so that motion in this direction alone does not cause the disc and cup to come into contact.

In some applications it may be desirable to employ a switch responsive to motion in any direction. Such a switch is shown in Figure 4 and consists of two switches such as are shown in Figure 3 mounted in a common housing with the axes of their rods at right angles to one another. The switches are connected in parallel in the electric alarm or warning circuit.

Figures 5 and 6 illustrate mechanism by which a switch mounted in an aircraft is made responsive not only to the motion of the aircraft, but also to distortion of the aircraft skin. A switch 40 generally resembling that shown in Figures 1 and 2 is mounted on a bar 42 arranged across two frames 44 and 46 of the aircraft. The skin 48 is fastened to the outside of the frames and two rods 50 and 52 are fastened to the skin between the frames. As shown in Figure 6 the rods 54 and 56 of the switch 40 are not rigidly mounted in the body 58 but are movable axially against a spring 60. The normal position of the rod 54 is determined by engagement of a collar 62 with an adjustable bush 64 through which the rod can slide. If the skin between the frame 44 and 46 is distorted inwards, the rod 50 bears against the end of the rod 54 and presses the latter inwards against the spring 60, so that the disc 66 is carried axially into engagement with the cup 68 and the electric circuit is closed.

If, on the other hand, the skin is distorted outwards, the rod 52 moves a rocking lever 70 which then bears on the rod 56 and presses it inwards so that again the circuit is closed.

In the embodiment shown both bodies undergo both linear and angular displacement relative to the housing of the switch. It is, however, only necessary for one body to undergo angular displacement since even if the other body is only displaced linearly the moment of inertia of the first body will become effective under conditions of sudden alteration of motion so that the two electrical contact surfaces are brought together.

There may be a tendency for the bodies to vibrate on their resilient supports, and by vibrating out of phase to give a false indication of crash conditions. This may be checked by mounting the switch in an enclosure filled with fluid or by eddy-current damping of the moving masses. It may also be desirable for the electric circuit of which the switch forms a part to include a slugged relay which will not close if there is only a momentary contact between the contact surfaces.

The sensitivity of a switch such as that shown in Figures 1 and 2 may be increased by arranging that under crash conditions the resilient supports pass beyond their elastic limit so that the displacements of the bodies become considerable and the supports acquire a permanent set so that the contact surfaces are not only brought together but are held together.

Switches according to the present invention are constructed so that they do not close when subjected to constant accelerations up to the highest which would be encountered in an aircraft in flight. Under much higher accelerations displacements of the masses become so large that the switch may close but such accelerations can only arise in crash conditions.

I claim:

1. An inertia switch comprising, in combination, a housing, a cup, a disc and two supports of substantially equal resilience connecting said cup and disc to said housing, said cup and disc being of substantially equal mass but having different transverse moments of inertia and said supports being so arranged that when said housing is at rest said disc lies concentrically within said cup and when said housing is subject to acceleration in a plane perpendicular to the longitudinal axes of said cup and disc, said cup and disc become displaced both linearly and angularly relatively to said housing.

2. An inertia switch comprising a housing subject to motion involving changes in the factors of velocity and acceleration at variable rates, two movable inertia bodies of substantial mass in said housing having cooperable contact surfaces arranged to be brought to relative positions of engagement and disengagement upon certain relative movements of said bodies, and separate resilient supports to which said bodies are affixed and which are independently mounted on said housing and serve normally to maintain said contact surfaces in one of said relative positions, said supports being arranged to yield when the housing is accelerated in a predetermined direction to cause both bodies to shift bodily relative to the housing, at least one of said supports causing angular displacement of its related body in conjunction with said bodily movement in relation to the housing, the masses and moments of inertia of said bodies and the resilient characteristics of said supports being such that the contact surfaces thereof remain in one of said relative positions when the housing is not subjected to changes in said factors at rates greater than certain predetermined values but are carried to the other of said relative positions under an abrupt change of one of said factors at a rate greater than the applicable predetermined value.

3. An inertia switch comprising a housing subject to motion involving changes in the factors of velocity and acceleration at variable rates, two movable inertia bodies of substantial mass in said housing having cooperable contact surfaces arranged to be brought to relative positions of engagement and disengagement upon certain relative movements of said bodies, and separate resilient supports to which said bodies are affixed and which are independently mounted on said housing and serve normally to maintain said contact surfaces in one of said relative positions, said supports being arranged to yield when the housing is accelerated in a predetermined direction to cause both bodies to shift bodily relative to the housing, at least one of said supports causing angular displacement of its related body in conjunction with said bodily movement in relation to the housing, the masses and moments of inertia of said bodies and the resilient characteristics of said supports being such that the contact surfaces thereof tend to remain in one of said relative positions in response to movements of the housing, involving changes in acceleration at rates less than a predetermined value but are carried to the other of said relative positions under an abrupt change of acceleration at a rate greater than said predetermined value.

4. An inertia member according to claim 3 in which the two bodies are of substantially equal mass but have differing transverse moments of inertia and the resilient supports are substantially identical.

5. An inertia switch according to claim 3 in which the bodies and their supports are symmetrical about a longitudinal axis so that the switch is responsive to the resolved component of motion of the housing in a plane perpendicular to that axis.

6. An inertia switch comprising a housing subject to motion involving changes in velocity and acceleration at variable rates, two movable inertia bodies of substantial mass in said housing having cooperable contact surfaces arranged to be brought to relative positions of engagement and disengagement upon certain relative movements of said bodies, and separate resilient supports for said bodies independently mounted on said housing and normally maintaining said contact surfaces in one of said relative positions, said supports being each in the form of a thin resilient rod joining the related body to the housing and said supports being arranged to yield when the housing is normally accelerated in a predetermined direction to cause both bodies to shift bodily relative to the housing, at least one of said supports causing angular displacement of its related body in conjunction with said bodily movement in relation to the housing, said bodies and their supports being symmetrical about a longitudinal axis so that the switch is responsive to the resolved component of motion of the housing in a plane perpendicular to that axis.

7. An inertia switch according to claim 6 in which the lengths of the rods is adjustable to control the operation of the switch.

8. An inertia switch according to claim 6 in which at least one rod is movable axially in the housing by external mechanism to carry said contact surfaces of the bodies from one of said relative positions to the other.

9. An inertia switch comprising a housing subject to motion involving changes in velocity and acceleration at variable rates, two movable inertia bodies of substantial mass in said housing having cooperable contact surfaces normally disengaged but arranged to be brought into engagement upon certain relative movements of said bodies, and separate resilient supports for said bodies independently mounted on said housing and normally maintaining said contact surfaces in one of said relative positions, said supports being arranged to yield when the housing is normally accelerated in a predetermined direction to cause both bodies to shift bodily relative to the housing, at least one of said supports causing angular displacement of its related body in conjunction with said bodily movement in relation to the housing, said inertia bodies being, respectively, a cup and a disc, the latter being supported concentrically within the cup when the housing is at rest, the masses and moments of inertia of said bodies and the resilient characteristics of said supports being such that the contact surfaces thereof remain out of engagement when the housing is subjected to changes in acceleration at rates less than a predtermined value but are carried into engagement under a sudden change of acceleration at a rate greater than said predetermined value.

10. An inertia switch according to claim 6 in which the bodies are, respectively, a cup and a disc, the latter being supported concentrically within the cup with the contact surfaces out of engagement when the housing is at rest.

11. An inertia switch according to claim 8 in which the bodies are, respectively, a cup and a disc, the latter being supported concentrically within the cup with the contact surfaces out of engagement when the housing is at rest.

12. An inertia switch comprising a housing subject to motion involving changes in velocity and acceleration at variable rates, two movable inertia bodies of substantial mass in said housing having cooperable contact surfaces arranged to be brought to relative positions of engagement and disengagement upon certain relative movements of said bodies, and separate resilient supports for said bodies independently mounted on said housing and normally maintaining said contact surfaces in one of said relative positions, said supports being arranged to yield when the housing is normally accelerated in a predetermined direction to cause both bodies to shift bodily relative to the housing, at least one of said supports causing angular displacement of its related body in conjunction with said bodily movement in relation to the housing, each of said resilient supports comprising a plurality of springs symmetrically disposed about the related body and extending outwardly therefrom to said housing, the masses and moments of inertia of said bodies and the resilent characteristics of said supports being such that the contact surfaces thereof remain in one of said relative positions when the housing is subjected to changes in acceleration at rates less than a predetermined value but are carried to the other of said relative positions under an abrupt change of acceleration at a rate greater than said predetermined value.

REGINALD WILLIAM JAMES COCKRAM.

References Cited in the file of this patent

UNITED STATES PATENTS

| Number | Name | Date |
|---|---|---|
| 2,426,034 | Leonard | Aug. 19, 1947 |

FOREIGN PATENTS

| Number | Country | Date |
|---|---|---|
| 569,542 | Germany | Feb. 3, 1933 |